(12) United States Patent
Möller

(10) Patent No.: US 7,598,735 B2
(45) Date of Patent: Oct. 6, 2009

(54) DEVICE FOR DETECTING THE POSITION OF A MOBILE TARGET

(75) Inventor: Rainer Möller, Chaponnay (FR)

(73) Assignee: Electricfil Automotive, Miribel, Cedex (FR)

( * ) Notice: Subject to any disclaimer, the term of this patent is extended or adjusted under 35 U.S.C. 154(b) by 351 days.

(21) Appl. No.: 11/256,198

(22) Filed: Oct. 24, 2005

(65) Prior Publication Data

US 2006/0161378 A1     Jul. 20, 2006

(30) Foreign Application Priority Data

Oct. 27, 2004  (FR) .................................. 04 11432

(51) Int. Cl.
*G01B 7/30*    (2006.01)
*G01P 3/42*    (2006.01)
(52) U.S. Cl. ................... 324/207.25; 324/173; 702/151
(58) Field of Classification Search ............. 324/207.2, 324/207.21, 207.24, 207.25, 173, 174; 702/148, 702/151
See application file for complete search history.

(56) References Cited

U.S. PATENT DOCUMENTS

| | | | | | |
|---|---|---|---|---|---|
| 4,966,041 | A | * | 10/1990 | Miyazaki | ............... 73/862.191 |
| 5,043,660 | A | * | 8/1991 | Hasegawa | ............... 324/207.12 |
| 6,050,242 | A | * | 4/2000 | Wilkinson | ............. 123/406.58 |
| 2004/0189285 | A1 | * | 9/2004 | Uenoyama | ............. 324/207.12 |

* cited by examiner

*Primary Examiner*—Patrick J Assouad
*Assistant Examiner*—David M. Schindler
(74) *Attorney, Agent, or Firm*—Dennison, Schultz & MacDonald

(57) ABSTRACT

A device for detecting the position of a mobile target equipped with at least one pattern and mounted so as to define a magnetic gap in which are placed at least two probes which are sensitive to the intensity of a physical magnitude where, for each passage of a pattern in front of a probe, the movement of the target causes a variation in the intensity of the physical magnitude detected by the probe.

12 Claims, 4 Drawing Sheets

DEVICE FOR DETECTING THE POSITION OF A MOBILE TARGET

BRIEF SUMMARY OF THE INVENTION

This present invention concerns the technical area of devices that are suitable for detecting the position and even the speed of a mobile object in the general sense.

BACKGROUND OF THE INVENTION

More precisely, this present invention concerns the technical area of sensors which are sensitive to the direction and intensity of a physical magnitude in order to enable detection of the position and even the speed of a mobile target fitted with at least one pointer in the general sense.

More particularly, the subject of the invention concerns the area of magnetic sensors that are adapted in order to enable detection not only of the speed of a mobile target but also its position when the mobile target is in a rest position.

In the current state of these techniques, we are familiar with magnetic sensors of the TPOS type (true power on state) which, when they are switched on, are able to supply a signal corresponding to the position of the mobile target. Such a sensor includes a mobile target created, for example, in a soft magnetic material and presenting at least one and in general a series of teeth separated by gaps. Such a sensor also includes a permanent magnet creating a magnetic gap with the mobile target. In this magnetic gap is placed a probe which is sensitive to the direction and to the intensity of a magnetic induction.

For each passage of a tooth in front of the probe, the movement of the mobile target causes a variation of the magnetic induction passing through the probe, which thus delivers an electrical signal that is a function of the direction and the amplitude of the magnetic induction. This sensitive probe is associated in particular with a hysteresis-type level comparator, whose output takes a first logical state when the electrical signal delivered by the probe is greater than a predetermined threshold and a second logical state when the electrical signal is less than a predetermined threshold.

This type of sensor supplies a signal corresponding to a gap or to a tooth, on switch-on of the sensor, without any target movement. The drawback of such a sensor is its insensitivity to the variation of parameters such as the temperature and the magnetic gap between the target and the sensor. Moreover, the signal delivered by such sensors generally contains a large offset, which renders it difficult to make use of the signal.

In the current state of these techniques, we are also familiar with a position and/or speed sensor that employs two sensitive probes connected to processing resources suitable for processing the output signals of the probes in a differential manner. Such a sensor has the advantage of eliminating the offset of the signal. Moreover, such a sensor is not very sensitive to variations in the magnetic gap and the temperature. However, such a sensor cannot supply a useful signal when switched on, since the differential signal is zero when the probes are located at the centre of a tooth or a gap.

Likewise, U.S. Pat. No. 6,452,381 describes a position sensor that includes a mobile target with gaps and teeth and moving in front of two magnetoresistive probes. The output signals of the probes are processed in a differential manner, so as to increase sensitivity. However the disadvantage of such a sensor is its serious insensitivity to variation of the magnetic gap between the target and the probes.

In the current state of these techniques, we are also familiar, from U.S. Pat. No. 5,444,370, with an angular position sensor that includes a mobile target equipped with two magnetic tracks, each moving in front of a probe which is sensitive to variations in magnetic induction. Although such a sensor is able to supply a useful signal on the position of the target on switch-on of the sensor while the target is not moving, such a sensor also has the drawback of requiring the provision of separate magnetic tracks.

Examination of the current state of these techniques leads to the observation that there is a requirement for a sensor that is practically insensitive to interference effects such as variations in the magnetic gap and the temperature, while still being capable of supplying a useful signal when switched on.

The subject of this present invention therefore aims to meet this requirement by proposing a device to detect at least the position of a mobile target, designed to be practically insensitive to variations of magnetic gap and temperature, while still supplying, at switch-on, a signal corresponding to the position of the mobile target.

In order to attain such an objective, the subject of the invention concerns a device to detect at least the position of a mobile target, equipped with at least one pattern or pointer, and mounted so as to define a magnetic gap in which are placed at least two probes which are sensitive to the intensity of a physical magnitude where, for each passage of a pattern in front of a probe, the movement of the target gives rise to a variation in the intensity of the physical magnitude detected by the probe, which then delivers an electrical output signal that is a function of the amplitude of the physical magnitude, and applied to the input of processing resources. According to the invention, the processing resources include the following:

resources for the determination of a first signal, known as an absolute signal, obtained from at least one output signal, resources for the determination of a second signal, known as a differential signal, obtained from the difference between at least two output signals, and resources comparing the absolute signal and the differential signal, delivering a binary signal representing at least the position of the mobile target.

According to one characteristic of the invention, the processing resources include resources to produce an offset value which is adapted in order to correct either the absolute signal or the differential signal, so that one of the said signals is greater than or less than the other when a pattern is respectively absent from or present in the magnetic gap.

According to one implementation variant, the resources for determination of the absolute signal uses the output signals delivered by the probes in order to calculate their sum.

According to another characteristic of the invention, the processing resources include resources for the inversion either of the differential signal or of the absolute signal so as to obtain a third signal, called the inverse signal.

According to one form of implementation, the comparison resources include a first resource for comparison between the absolute signal and the differential signal (or their inverse signals) so as to detect a passing edge of the target when the values of the said two signals are equal.

According to this form of implementation, the first comparison resource delivers a binary state that is determine when the absolute signal is greater (or less) than the differential signal.

According to another form of implementation, the comparison resources include a second resource for comparison between the absolute signal and the inverse differential signal (or their inverse signals) so as to detect a passing edge of the target when the values of the said two signals are equal.

According to this form of implementation, the second comparison resource delivers a binary state that is determined when the inverse differential signal is greater (or less) than the absolute signal.

Advantageously, the first and second comparison resources are connected to logical processing resources delivering a binary signal at a state which is determined only when the differential and inverse differential signals are less (or greater) than the absolute signal.

The comparison resources can be threshold comparators for example.

By way of an example, the logical processing resources connected to the comparison resources take the form of a logical AND gate.

According to another advantageous characteristic of the invention, the processing resources include a high-pass filter, to the input of which is applied the differential signal with a view to eliminating its offset values.

According to one implementation variant, the absolute signal and the differential signal are determined by assigning to each output signal, gain coefficients which are specified so that the amplitude of the differential signal is equal to or greater than the amplitude of the absolute signal.

Diverse other characteristics emerge from the description provided below, with reference to the appended figures which show, by way of non-limited examples, various forms of implementation of the subject of the invention.

BRIEF DESCRIPTION OF THE DRAWINGS

FIG. 2A is a functional block diagram describing an example of a device according to the invention wherein comparison resources (14) include a first comparison resource (22).

DETAILED DESCRIPTION OF THE INVENTION

Figure 1:
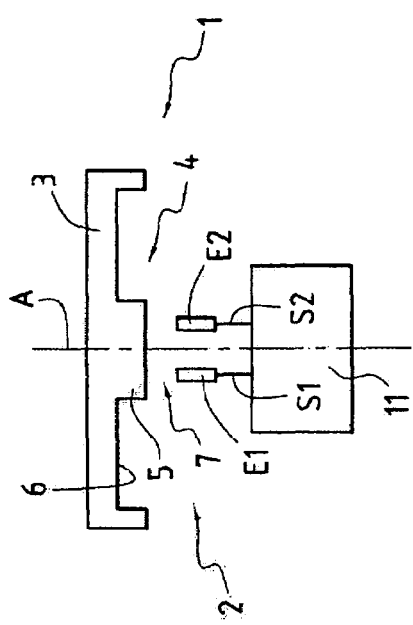
FIG. 1 is a schematic view of a detection device according to the invention.

FIG. 1 illustrates a device 1 that is suitable for detection of the position and even the speed of a mobile object, preferably but not exclusively moving around an axis of rotation A. The device 1 includes a position sensor 2 that includes a mobile target 3 attached to the mobile object whose position and even speed are to be detected. In the illustrated example, the position sensor 2 is of the rotating type so that the mobile target 3 is of circular shape rotating around its centre. In a conventional manner, the mobile target 3 is equipped with at least one, and in general with a series of patterns or pointers 4 composed, for example, of teeth 5 separated from each other by gaps 6. The patterns 4 are positioned on a circular or peripheral track created on the target 3.

The mobile target 3 defines a magnetic gap 7 in which are placed at least two, and in the illustrated example, exactly two probes $E_1$, $E_2$ which are sensitive to the intensity of a physical magnitude detected by the probe. In the example that follows, each probe $E_1$, $E_2$ is sensitive to the intensity of a magnetic induction created in the magnetic gap 7 by means of a magnet.

Naturally, the subject of the invention can equally well apply to a physical magnitude other than a magnetic field, such an electric field for example.

In the illustrated example, for each passage of a pattern 4 in front of a probe, the movement of the mobile target 3 causes a variation of the magnetic induction passing through the probe. Each probe $E_1$, $E_2$ thus delivers an output signal $S_1$, $S_2$ respectively which is a function of the amplitude of the magnetic induction. In the conventional manner, the output signals $S_1$, $S_2$ are applied to processing resources 11 that are either inbuilt or remote in relation to the position sensor 2.

Figure 2:
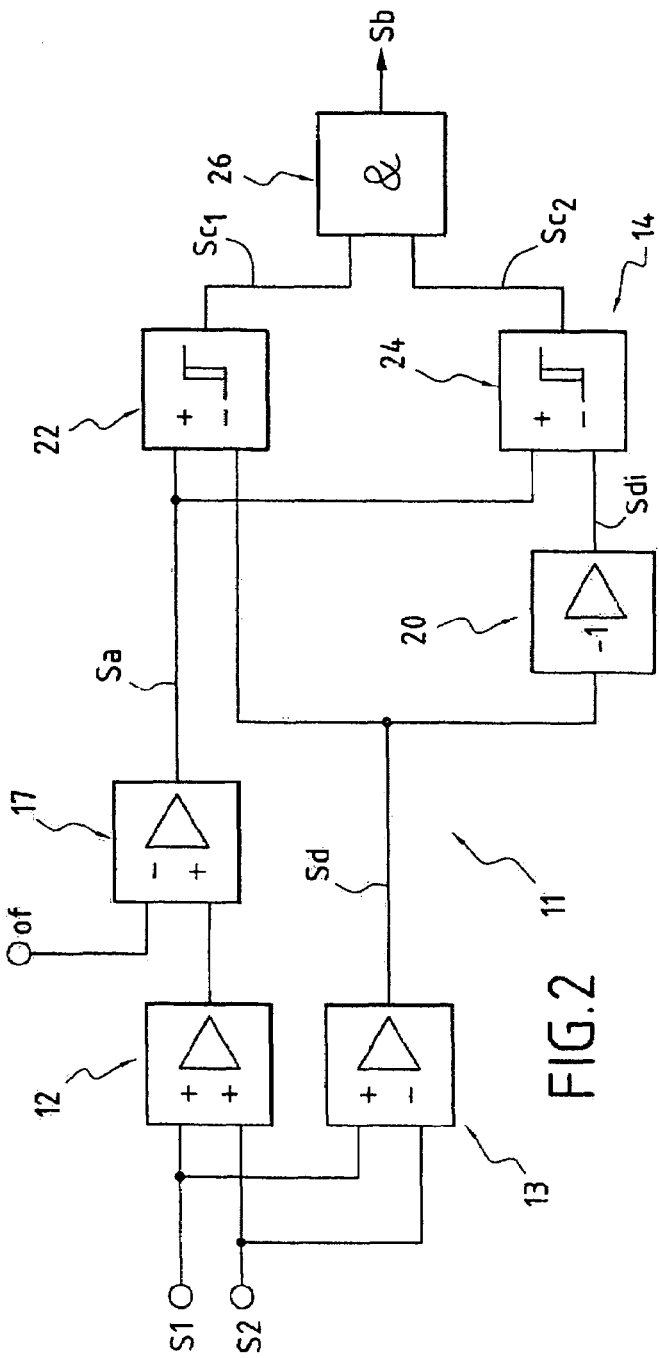
FIG. 2 is a functional block diagram describing an example of a device according to the invention.
Figure 2:
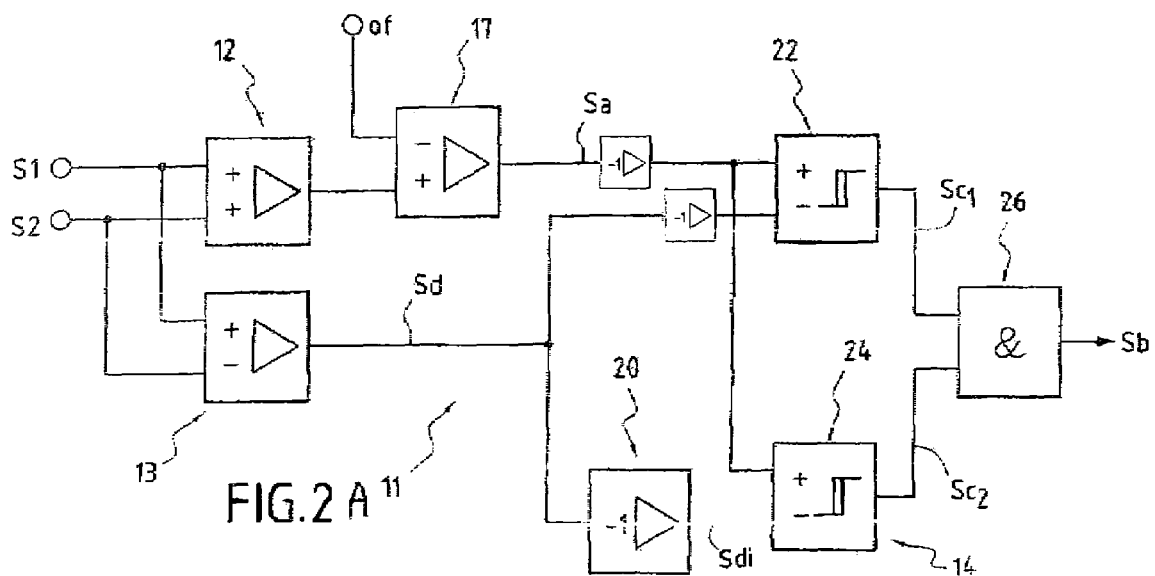
Figure 2B:
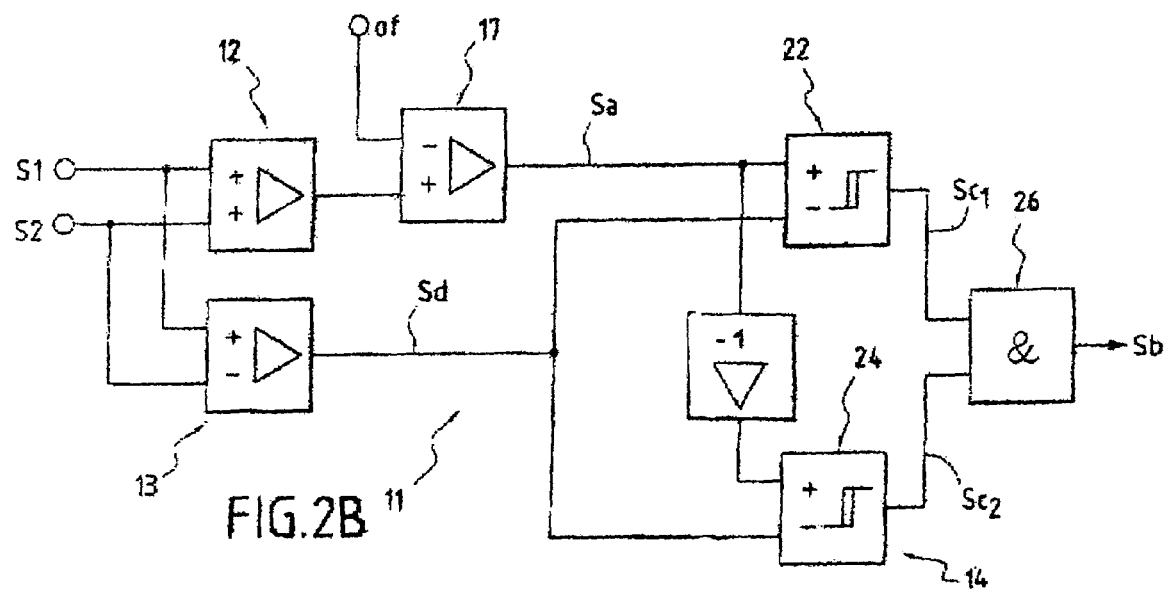
FIG. 2B is a functional block diagram describing an example of a device according to the invention wherein comparison resources (14) include a second comparison resource (24).

According to the invention, and as can be seen more precisely in FIG. 2, the processing resources 11 include:
resources 12 for the determination of a first signal, known as an absolute signal $S_a$ obtained from at least one output signal $S_1$, $S_2$,
resources 13 for the determination of a second signal, known as a differential signal $S_d$ obtained from the difference between at least two output signals $S_1$, $S_2$,
and resources 14 for comparison between the absolute signal $S_a$ and the differential signal $S_d$, delivering a binary signal $S_b$ representing at least the position of the mobile target 3.

According to the invention, the processing resources 11 include resources capable of producing an offset value $O_f$ arranged in order to correct either the absolute signal $S_a$ or the differential signal $S_d$ so that one of the said signals is greater or less than the other when a pattern or pointer is absent from or present in the magnetic gap 7. In the illustrated example, the offset value $O_f$ is applied in order to correct the absolute signal $S_a$.

In the example of implementation illustrated in FIG. 2, the resources for determination 12 of the absolute signal use the output signals $S_1$, $S_2$ delivered by the two probes $E_1$, $E_2$ in order to produce their sum. According to this example, the resources 12 for the determination of the absolute signal include an analogue summing circuit whose inputs are connected to the probes $E_1$, $E_2$.

In the illustrated example, the signal emerging from the analogue summing circuit 12 is applied to the input of an analogue subtraction circuit 17 whose other input receives the offset value $O_f$. The analogue subtraction circuit 17 thus delivers the absolute signal $S_a$ which is obtained from the sum of the two output signals $S_1$, $S_2$, combined with the offset value $O_f$.

In the preceding description, the absolute signal $S_a$ is obtained by producing the sum of the two output signals delivered by the probes. It should be noted that the absolute signal $S_a$ can be obtained by using one and/or the other of the output signals $S_1$, $S_2$ delivered by the probes, and producing, for example, the weighted sum of the signals. In general, it should be considered that for output signals coming from probes $E_i$ with i=1 to x, the absolute signal $S_a$ takes the following general form:

$$S_a = n_1 \cdot S_1 + n_2 \cdot S_2 + \ldots + n_x \cdot S_x - O_f$$

where $n_1$ to $n_x$ gain are coefficients equal to or greater than 0, and at least one of these coefficients is other than zero.

In the illustrated example, the resources 13 for the determination of the differential signal $S_d$ take the form of an analogue subtraction circuit, to the inputs of which are applied the output signals $S_1$, $S_2$.

In general, it should be considered that for x output signals coming from probes $E_i$, the differential signal $S_d$ takes the following general form:

$$S_d = p_1 \cdot S_1 + p_2 \cdot S_2 + \ldots + p_x \cdot S_x$$

with $p_1$ to $p_x$ being gain coefficients in which at least one of the factors $p_1$ to $p_x$ is >0 and at least one of the factors $p_1$ to $p_x$ is <0.

According to a preferred implementation characteristic, the gain or amplification coefficients $n_1$ to $n_x$ and $p_1$ to $p_x$ are specified so that the amplitude of the differential signal $S_d$ is equal to or greater than the amplitude of the absolute signal $S_a$.

Advantageously, the processing resources 11 include resources for the inversion 20 either of the differential signal $S_d$ or of the absolute signal $S_a$ so as to obtain a third signal called the inverse signal. In the illustrated example, the inversion resources 20 invert the differential signal $S_d$ so as to obtain an inverse differential signal $S_{di}$, for example, where these inversion resources 20 take the form of an analogue inverter circuit.

Figure 3:
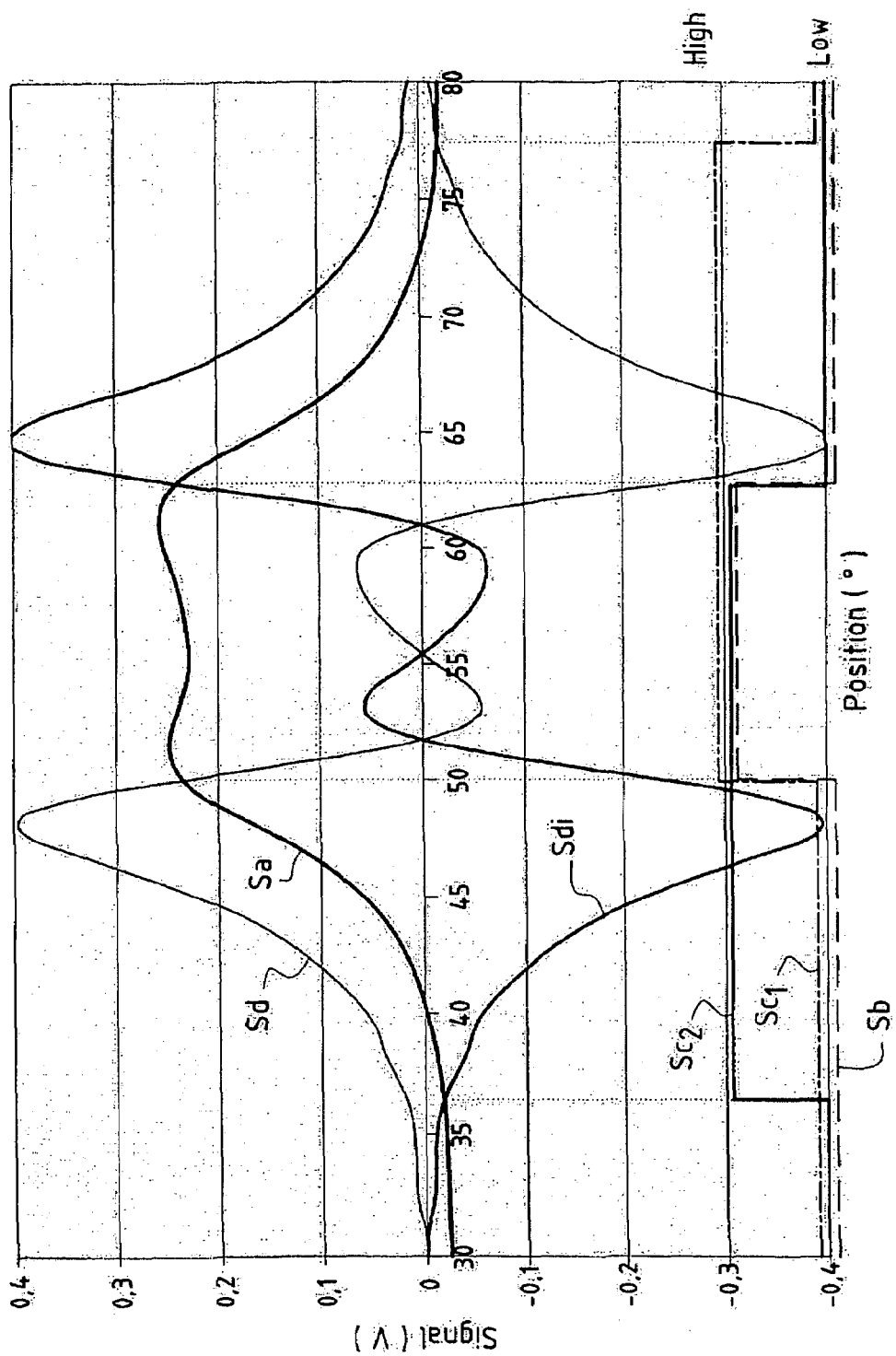
FIG. 3 is a view of different signals employed to explain the subject of the invention.

The comparison resources 14 include a first resource 22 for comparison between the absolute signal $S_a$ and the differential signal $S_d$ so as to detect a passing edge of the target 3 when the values of the signals are equal. As can be seen more precisely in FIG. 3, the comparison resource 22 delivers a binary signal $S_{c1}$ which occupies a state that, for example, is low when the differential signal $S_d$ is greater than the absolute signal $S_a$ and at the high state when the differential signal $S_d$ is less than the absolute signal $S_a$. According to this example, such a comparison can be used to detect the passage from a gap to a tooth on the target 3.

The comparison resources 14 include a second resource 24 for comparison between the absolute signal $S_a$ and the inverse differential signal $S_{di}$ so as to detect a passing edge of the target when the values of the signals are equal. The comparison resource 24 delivers a binary signal $S_{c2}$ which occupies a state that, for example, is low when the inverse differential signal $S_{di}$ is greater than the absolute signal $S_a$ and at the high state when the inverse differential signal $S_{di}$ is less than the absolute signal $S_a$. According to this example, such a comparison can be used to detect the passage from a tooth to a gap on the target 3. The comparison resources 22, 24 are comparators with at least one threshold.

The first and second comparison resources 22, 24 are connected to logical processing resources 26 delivering a binary signal $S_b$ at a state which is determined only when the differential $S_d$ and inverse differential $S_{di}$ signals are less than the absolute signal $S_a$. The logical processing resources 26 are composed, for example, of a logical AND gate which supplies an output signal $S_b$ at a logical state that, for example, is high only when the signals $S_{c1}$, $S_{c2}$ are simultaneously at the high state. In this case, a tooth 5 is positioned in front of the probes. This relation is verified even when the differential signal $S_d$ is equal to zero, corresponding to the position of a tooth 5 or of a gap 6 at the centre of a probe. To this end, the offset signal $O_f$ has been chosen so as to supply a positive signal in front of a tooth 5 and a negative signal in front of a gap 6. The sensor 2 thus supplies a signal at start-up, that is with the mobile target stopped, and with no need to change the operating mode.

In the example described, the first comparison resource 22 compares the absolute signal $S_a$ and the differential signal $S_d$ while the second comparison resource 24 compares the absolute signal $S_a$ and the inverse differential signal $S_{di}$. Naturally, it can be arranged that the second comparison resource 24 compares the inverse absolute signal and the differential signal $S_d$.

In like manner, to the extent that the binary signal $S_b$ is at the high state, if $S_a > S_d$ and $S_a > S_{di}$, different formulae can be envisaged to determine signals $S_a$, $S_d$, and $S_{di}$ and, as an example, one can envisage the creation of the following processing functions:

$$(n_1 \cdot S_1 + n_2 \cdot S_2 \ldots + n_x \cdot S_x - O_f) > (p_1 \cdot S_1 + p_2 \cdot S_2 \ldots + p_x \cdot S_x)$$

and $(n_1 \cdot S_1 + n_2 \cdot S_2 \ldots + n_x \cdot S_x - O_f) < (p_1 \cdot S_1 + p_2 \cdot S_2 \ldots + p_x \cdot S_x)$ or:

$$(n_1 \cdot S_1 + n_2 \cdot S_2 \ldots + n_x \cdot S_x - O_f) - (p_1 \cdot S_1 + p_2 \cdot S_2 \ldots + p_x \cdot S_x) > 0$$

$$(n_1 \cdot S_1 + n_2 \cdot S_2 \ldots + n_x \cdot S_x - O_f) - (p_1 \cdot S_1 + p_2 \cdot S_2 \ldots + p_x \cdot S_x) < 0$$

or:

$$(n_1 \cdot S_1 + n_2 \cdot S_2 \ldots + n_x x S_x - O_f) > |(p_1 \cdot S_1 + p_2 \cdot S_2 \ldots + p_x \cdot S_x)|$$

According to this last example, it should be noted that the absolute signal can be compared to a rectified differential signal.

According to another advantageous characteristic of the invention, the processing resources 11 include a high-pass filter, to the input of which is applied the differential signal $S_d$ with a view to eliminating its offset values. The differential signal $S_d$ is then equal to a zero value when the speed of the target 3 is less than the passband of the filter. In this case, the sensor functions in TPOS mode. If the speed increases, the sensor passes progressively from the TPOS mode to the differential mode as the differential signal $S_d$ increases.

The invention is not limited to the examples described and represented, since various changes can be made to it without moving outside of its scope.

The invention claimed is:

1. A device to detect at least the position of a mobile target equipped with at least one pattern and mounted so as to define a magnetic gap in which are placed at boot two probes that are sensitive to intensity of a physical magnitude where, for each passage of a pattern in front of the at least two probes, movement of the target causes a variation in the intensity of the physical magnitude detected by the at least two probes, the at least two probes deliver at least two electrical output signals that are a function of the amplitude of the physical magnitude, and are applied to an input of processing resources, wherein the processing resources include:
   resources to produce an offset value of;
   resources for the determination of a first signal known as an absolute signal Sa, obtained from at least one of the at least two output signals;
   wherein the absolute signal takes the following form:

$$S_a = n_1 \cdot S_1 + n_2 \cdot S_2 + \ldots + n_x \cdot S_x - Of$$

where $n_1$ to $n_x$ are gain coefficients equal to or greater than 0, and at least one of these coefficients is other than zero;
   and $S_1$ to $S_x$ are the at least two output signals;
   resources for the determination of a second signal, known as a differential signal, obtained from a difference between the at least two output signals; and
   resources for comparison between the absolute signal and the differential signal, the comparison delivering a binary signal representing at least the position of the mobile target.

2. A device according to claim 1, wherein the offset value is adapted in order to correct either the absolute signal or the differential signal, so that one of the absolute signal or differential signal is greater or less than the other when a pattern is respectively absent or present in the magnetic gap.

3. A device according to claim 1, wherein the processing resources include resources for an inversion either of the differential signal or of the absolute signal so as to obtain a third signal called an inverse signal.

4. A device according to claim 3, wherein the comparison resources include a first resource for comparison between the absolute signal and the differential signal or an inversion of the absolute signal and an inversion of the differential signal so as to detect a passing edge of the target when the values of the said two signals are equal.

5. A device according to claim 4, wherein the first comparison resource delivers a binary signal that is determined when the absolute signal is greater or less than the differential signal.

6. A device according to claim 4, wherein the comparison resources include a second comparison resource for comparing the absolute signal and the inverse differential signal, or the inverse signals of the absolute signal and the inverse differential signal, so as to detect a passing edge of the target when the values of either the absolute and the inverse differential signals or the inverse absolute and the differential signals are equal.

7. A device according to claim 6, wherein the second comparison resource delivers a binary signal at a state that is determined when the inverse differential signal is greater or less than the absolute signal.

8. A device according to claim 6, wherein the first and second comparison resources are connected to logical processing resources delivering a binary signal at a state which is determined only when the differential and inverse differential signals are less or greater than the absolute signal.

9. A device according to claim 5, wherein the comparison resources are threshold comparators.

10. A device according to claim 8, wherein the logical processing resources connected to the comparison resources take the form of a logical AND gate.

11. A device according to claim 1, wherein the processing resources include a high-pass filter.

12. A device according to claim 1, wherein the absolute signal and the differential signal are determined by assigning to each output signal, gain coefficients which are specified so that the amplitude of the differential signal is equal to or greater than the amplitude of the absolute signal.

* * * * *